Aug. 24, 1926.
E. DICKEY ET AL
1,597,649
ELECTRICAL APPARATUS
Filed Sept. 25, 1922    2 Sheets-Sheet 2
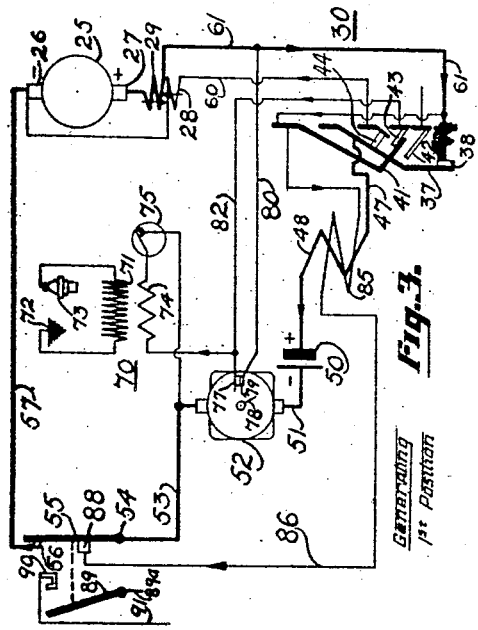
Fig.1. Generating 1st Position
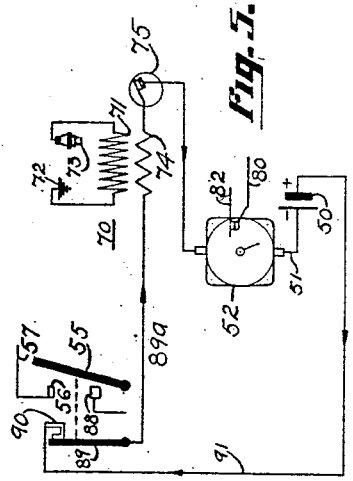
Fig.5. Generator Idle
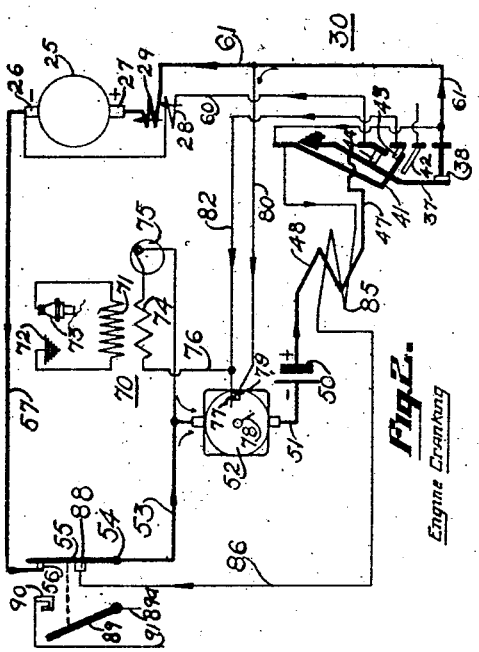
Fig.2. Engine Cranking
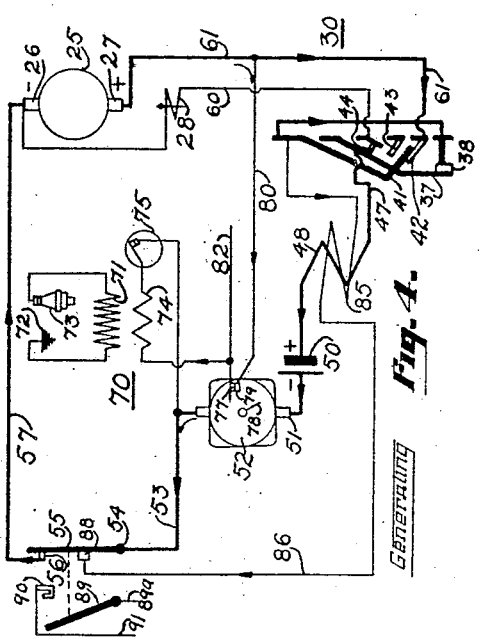
Fig.4. Generating
Witnesses
Warren Schmieding
Mildred Pearl
Inventors
Ernest Dickey and
Lester S. Keilholtz
By
J. Ralph Fehr
their Attorney Patented Aug. 24, 1926.

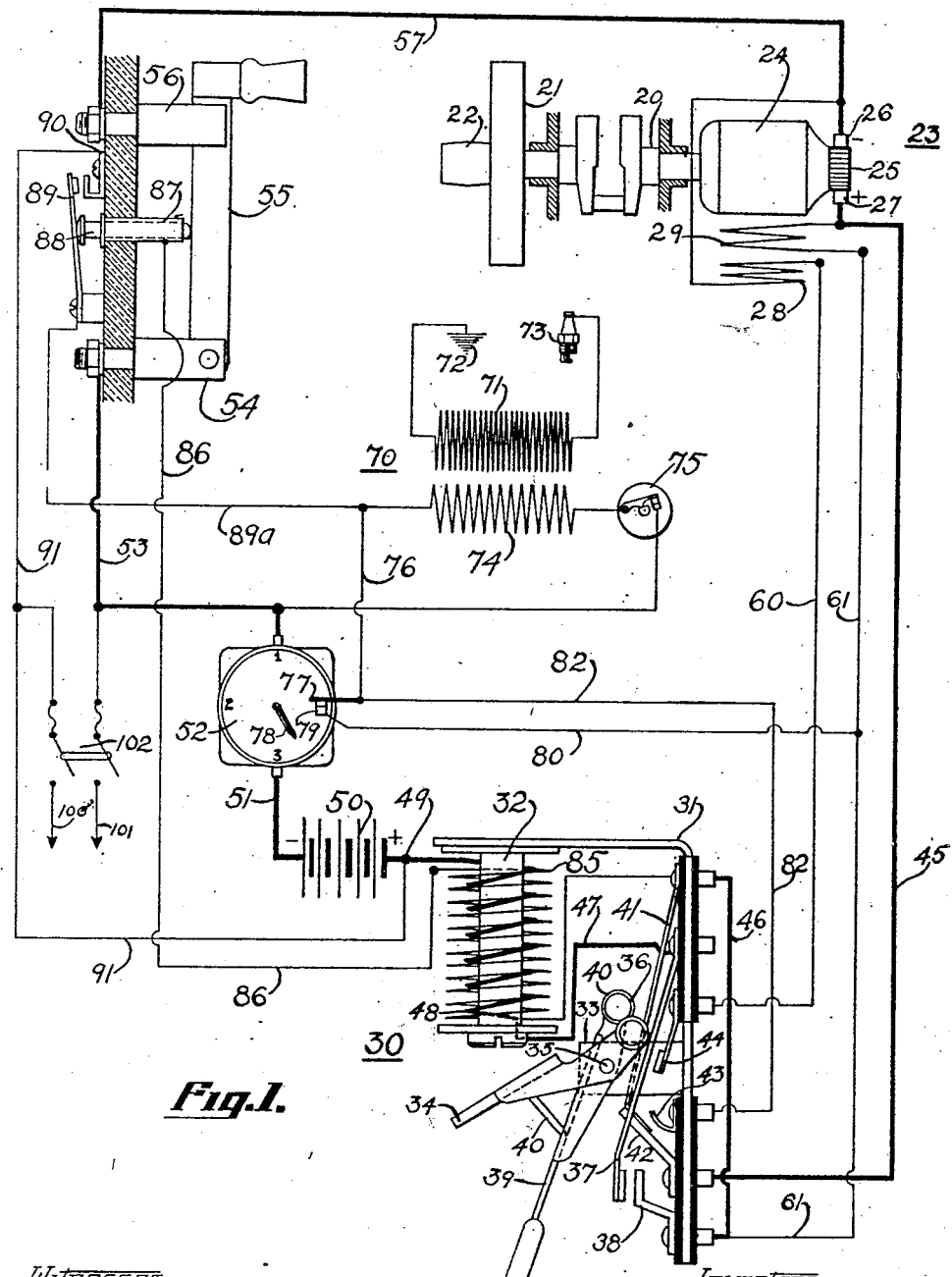

1,597,649

UNITED STATES PATENT OFFICE.

ERNEST DICKEY AND LESTER S. KEILHOLTZ, OF DAYTON, OHIO, ASSIGNORS TO DELCO-LIGHT COMPANY, OF DAYTON, OHIO, A CORPORATION OF DELAWARE.

ELECTRICAL APPARATUS.

Application filed September 25, 1922. Serial No. 590,269.

This invention relates to power plants, and particularly to the type wherein an internal-combustion engine drives a generator for producing current for a storage battery or a work circuit, there being a pulley or other similar device driven by the engine from which mechanical power may be transmitted.

The preferred embodiment of the present invention constitutes an improvement in the apparatus described and claimed in the copending application of Charles F. Kettering and William A. Chryst, Serial No. 120,098, filed September 14, 1916. In this application there is disclosed a battery charging system wherein a dynamo driven by an internal-combustion engine charges a storage battery. The engine is provided with electrical ignition apparatus in order to stop the charging operation after a predetermined state of battery charge has been reached. A metering device such as an ampere hour meter is connected in the charging circuit and this ampere hour meter controls the ignition switch contacts to open the ignition circuit after the battery charging operation has continued a certain extent. Upon interruption of the ignition circuit the engine can no longer run, and as the generator speed falls off the battery charging system is broken by means of a reverse current relay.

It is among the objects of the present invention to provide means whereby the engine may be rendered operative whether or not the battery is substantially fully charged and the ignition switch contacts separated by the action of the ampere hour meter.

A further object of the invention is to provide means for disconnecting the generator field winding in order to render the generator inoperative while at the same time the engine may continue to run, the ignition current being supplied by the battery.

In the copending application referred to the battery charging system includes a reverse current relay the circuit making armature of which is operated manually to close circuits between the battery, generator, and ignition systems. After the engine has become self-operative this armature is maintained in circuit closing position. Then when the battery charging has continued for a predetermined amount, the ignition contacts are broken by the ampere hour meter and when the engine speed decreases there is a reversal of current in the relay. The relay is then restored to its inoperative position to interrupt the battery charging. When the plant in the present invention is operating only to charge the batteries, it is an object to automatically stop the plant when the batteries are charged in the same manner as in the copending application. And when the plant is operating to charge the batteries and for operating other devices by means of the pulley, auxiliary ignition means is provided for operating the engine after the batteries are charged and when the relay armature is in its inoperative position, the arrangement being such that when the auxiliary ignition means is discontinued to stop the engine, the plant is again restored to the condition in which it may be made operative by the operation of the manually controlled reverse current relay armature.

Further objects and advantages of the present invention will be apparent from the following description, reference being had to the accompanying drawing, wherein a preferred embodiment of one form of the present invention is clearly shown.

In the drawings:

Fig. 1 is a wiring diagram of the present invention;

Figs. 2, 3, and 4 are wiring diagrams of circuits shown in Fig. 1, respectively, during the cranking period, generating with the series field operative, and generating with only the shunt field operative; and Fig. 5 is a fragmentary diagram showing how ignition current is supplied while the generator is inoperative.

In the drawings:

An internal-combustion engine which is represented by a crank shaft 20, a flywheel 21, and a belt pulley 22, drives a generator 23 having an armature 24, commutator 25, and brushes 26 and 27, a shunt field 28, and a series field 29, the controller and reverse current relay unit designated by numeral 30 includes a frame 31, a core 32, a post 33, and an armature 34 pivoted at 35, all of said parts being of magnetizable material. When the armature 34 is held in attracted position adjacent the core 32 a roller 36 carried by said armature will push the contact 37 into engagement with contact 38. The armature 34 is moved into this position by means of a lever 39 having a finger 40 for engaging the armature 34, and lever 39 is pivoted at 35 and carries a roller 40 which, when the lever is in position for holding the armature 34 against the core 32, will move a spring contact 41 away from contact 42 and into engagement with contact 43. The leaf contact 37 is held in engagement with a contact 44 while contact 37 engages contact 38. Contact 42 is connected by wire 45 with brush 27, contact 41 by wire 46 with contact 38, contact 37 by wire 47, with relay series coil 48 which is connected with terminal 49 of battery 50. Battery 50 is connected by wire 51 with ampere hour meter 52 which in turn is connected by wire 53 with switch terminal 54. 54 is connected by knife switch 55 with contact 56 which is connected by wire 57 with generator brush 26. By the closing of contacts 37 and 38 the battery charging circuit which includes the heavy lines in Fig. 1 will be established.

The shunt field 28 is connected with brush 26 and by wire 60 with terminal 44. The series field 29 is connected by wire 61 with contact 38.

The ignition coil 70 includes a secondary 71 grounded at 72 and connected with a spark plug 73, and includes a primary 74 having one end connected with timer 75 which in turn is connected with wire 53. The other end of primary 74 is connected by wire 76 with a movable switch contact 77 adapted to be engaged by the hand 78 of the ampere hour meter 52. Contact 77 may engage a contact 79 which is connected by wire 80 with wire 61. Contact 43 is connected by wire 82 with wire 76. Wire 46 and contact 41 are connected with reverse current relay shunt winding 85 which is connected by wire 86 with a sleeve 87 in which a plunger 88 is slidably mounted. The head of this plunger is adapted to engage a contact 89 which may engage a contact 90 when the plunger 88 is released. The contact 90 is connected by wire 91 with battery terminal 49.

The work circuit includes leads 100 and 101 connected by switch 102 with wire 53 on one side of the line and with wire 91 which connects with the other side of the line.

The operation of the invention is as follows: Assuming the battery is not fully charged and it is desired to continue the battery charging operation, the operator pulls up the lever 39 so that the armature 34 will be held adjacent to core 32. This will cause the contact 37 to engage the contact 38 and the contact 41 to be separated from the contact 42 and to engage the contact 43, the contact 37 will also engage the contact 44. The main cranking circuit is clearly indicated in Fig. 2 by the heavy black lines, and this circuit includes battery 50, coil 48, wire 47, contact 37, contact 38, wire 61, series field 29, dynamo brushes 27 and 26, wire 57, contact 56, blade 55, terminal 54, wire 53, ampere hour meter 52, and wire 51. The shunt field winding 28 will also be connected and will include the following circuit: Brush 26, winding 28, wire 60, contact 44, contact 37, contact 38, wire 61, field 29, brush 27. During the cranking operation ignition current will be supplied through wire 80 leading from wire 81, contacts 79, 77, wire 76, primary 74, timer 75, which is connected with the opposite side of the line. The relay shunt winding 85 is connected across the line from contact 41 through wire 86 to contact 88 which normally is in engagement with the blade 55. During the cranking operation the field windings 28 and 29 operate cumulatively to produce a field suitable for engine starting. The relay windings 28 and 85 operate differentially as long as the battery is discharging current through the generator.

In case the battery is fully charged and the ampere hour hand 78 is in such position as to separate contact 77 from contact 79 ignition for the engine can still be maintained through the following circuit: contact 41 which is on one side of the line and touches contact 43, then through wire 82, wire 76, ignition primary 74, timer 75, which is connected to wire 53 on the other side of the line. It is evident therefore that the engine can always be cranked whether or not the ampere hour meter shows the battery is fully charged and the ignition contacts operated by the meter hand are separated.

After the engine has become self-operative and has attained generating speed there will be a reversal of current through the series field winding 29 and through the relay series winding 48. In Fig. 3 these conditions are shown by the arrow heads on different circuits representing the direction of current flow. In Fig. 3 the circuits shown exist as long as the controller hand 39 is held in uppermost position. Since the windings 85 and 48 now act cumulatively, the lever 39 may be released since the armature 34 will be maintained in attracted position. Upon release of the lever 39 the contact 41 will move away from the contact 43 into engagement with contact 42. This extra ignition circuit or by-pass around the ampere hour meter controlled contacts 77, 79 will be broken and the series field 29 will be short circuited by the closing of contacts 41 and 42. These conditions are clearly shown in Fig. 4 in which the main generating and battery charging circuit is clearly indicated by heavy black lines. Only the shunt field winding is used to excite the field during generating operation.

When it is desired to operate the engine in order that a belt may be driven from the pulley 22 without operating the generator and charging the battery, the knife switch 55 is pulled out of engagement with the contact 56 thereby breaking the battery charging circuit. When this circuit is broken the winding 48 will receive no current and the separation of the contacts 55 and 56 also breaks contact between contact 55 and 88 therefore the winding 85 will receive no current. As the result there will be no magnetism in the core 32 and the armature 34 will be restored to position shown in Fig. 1. When the knife switch 55 is pulled out the plunger 88 will be released permitting the contacts 89 and 90 to engage therefore ignition will be provided through the following primary circuit: battery 50, wire 91, contacts 90 and 89, wire 89ª, primary 74, timer 75, ampere hour meter 52, wire 51. At this time there is but one path for ignition current from the battery. Therefore to stop the engine the switch 55 is pressed into engagement with contact 56 and with the plunger 88 thereby separating contact 89 from contact 90. Conditions are now restored to a state of inoperativeness, but however the circuits are set up so that the controller 30 can be operated. As long as the switch 55 is pulled out the engine will continue to run, other conditions being favorable such as adequate supply of fuel. But manipulation of the switch handle 39 will have no effect because current cannot get out of the battery into the generator nor into the ignition except through the contacts 89 and 90. It will be apparent that so long as the switch 55 is in circuit closing position as shown in Fig. 1 the system is in condition for manual starting and automatic stopping. The plant cannot be started except by hand cranking if the switch 55 be pulled out at the time the controller lever 39 is operated since no current can be sent from the battery to the dynamo to operate the latter as a motor. If one should try to operate the plant by starting the engine by hand with switch 55 out, manipulation of the controller 30 will have no effect, therefore all of the automatic features of the system will be protected. If an attempt is made to operate the charging system by pulling up the lever 39 when the batteries are fully charged and the ignition contacts broken at 77, 79 the engine could be operated but such a process would require the operator to keep hold of the lever 39. This however is not likely to occur, and upon the release of the lever 39 the armature 34 would be held in contact making position only for a brief instant, just long enough for the current to back up into the dynamo from the battery, it being assumed that the battery is fully charged and the contact 77 is separated from the contact 79. Therefore inadvertently holding contact 55 and armature 34 in circuit making position with the batteries fully charged while the engine is running will do no harm provided the lever 39 is not held up intentionally through a period long enough to seriously overcharge the batteries. The usual operation would be to release a lever 39 after the engine had become self-operative whereupon all of the by-passes or short circuits around the contacts 77 and 79 will be interrupted. Therefore the ampere hour meter will be operative to interrupt the ignition system.

It is apparent that there has been provided a system of control which is particularly useful in conjunction with automatic stop charge systems and whereby the electrical load may be discontinued at will while the engine continues in operation to supply mechanical power.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. In a power plant, the combination with an internal-combustion engine and a dynamo driven thereby; of a battery charged by the dynamo; electrical ignition devices connected with the dynamo; means including a holding magnet for maintaining closed circuit connections between the battery and dynamo, said magnet being deenergized upon current reversal to disconnect the battery from the dynamo and to interrupt the dynamo field circuit; and manually operable means for causing said magnet to be deenergized whereby the engine may be operated without the dynamo charging the battery and with the dynamo idle, said manual means also connecting the battery with the ignition devices.

2. In a power plant, the combination with an engine and a dynamo driven thereby; of a battery charged by the dynamo; means including a holding magnet for maintaining closed the dynamo field circuit and circuit connections between the battery and dynamo, said magnet being deenergized upon current reversal to disconnect the battery from the dynamo and to interrupt the dynamo field circuit; and manually operable means for causing said magnet to be deenergized whereby the engine may be operated without the dynamo charging the battery and with the dynamo idle.

3. In a power plant, the combination with an engine and a dynamo driven thereby; of a storage battery charged by the dynamo; means for connecting the battery and dynamo and for connecting the dynamo field circuit, said means being rendered inoperative upon battery discharge to the dynamo; and manually operable means for causing said first means to be inoperative whereby the engine may be operated without the dynamo charging the battery and with the dynamo idle.

4. In a power plant, the combination with an internal-combustion engine and a dynamo driven thereby; of a storage battery charged by the dynamo; electrical ignition devices normally connected with the dynamo; means for connecting the battery and dynamo and for connecting the dynamo field circuit, said means being rendered inoperative upon battery discharge to the dynamo; and manually operable means for rendering said first means inoperative and for connecting the ignition devices with the battery whereby the engine will continue to run with the generator idle and with the battery disconnected therefrom.

5. In a power plant, the combination with an internal-combustion engine and a dynamo connected therewith and operable as a motor to crank the engine or as a generator when driven by the engine; of a storage battery; means for connecting the battery with the dynamo and for rendering the dynamo operative as a motor to crank the engine; means for maintaining a circuit between the dynamo and battery and for connecting up the dynamo generating field circuit whereby the dynamo will be operative to charge the battery, said means being rendered automatically inoperative upon battery discharge to the dynamo; and manually operable means for rendering said second means inoperative whereby the engine may be operated with the generator idle and disconnected from the battery.

6. In a power plant, the combination with an internal-combustion engine and a dynamo connected therewith and operable as a motor to crank the engine or as a generator when driven by the engine; of a storage battery; electrical ignition devices normally connected with the dynamo; means for connecting the battery with the dynamo and for rendering the dynamo operative as a motor to crank the engine; means for maintaining a circuit between the dynamo and battery and for connecting up the dynamo generating field circuit whereby the dynamo will be operative to charge the battery, said means being rendered automatically inoperative upon battery discharge to the dynamo; and manually operable means for rendering said second means inoperative whereby the engine may be operated with the generator idle and disconnected from the battery, said manual means providing a connection between the battery and ignition devices.

7. In a power plant, the combination with an internal combustion engine and a dynamo connected therewith and operable as a motor to crank the engine or as a generator driven by the engine; of a storage battery; of a starting switch for connecting the dynamo and battery for causing the dynamo to operate as a motor and for maintaining a circuit between the dynamo and battery when the dynamo operates as a generator; of a second switch for controlling the connection between the dynamo and battery; of a holding coil for the first switch, said coil being arranged in series relation with both switches; of ignition devices for the engine; of an ignition switch for rendering the ignition devices operative by closing the starting switch; of a second ignition switch for rendering the ignition devices operative by the opening of the second named battery and dynamo control switch; and manual means for moving said starting switch and said first named ignition switch to crank the engine and render the ignition devices operative.

8. In a power plant, the combination with an internal combustion engine and a dynamo connected therewith and having a shunt field circuit; of a switch for controlling said field circuit; of a storage battery; of means for connecting the battery and dynamo and for controlling said field circuit switch for rendering the field circuit operable, said means being rendered inoperative upon diminution of current flow from the dynamo to the battery; and manually operated means for causing said first means to be inoperative whereby said field circuit is rendered inoperative whereby the engine may be operated with the dynamo idle.

9. In a power plant, the combination with an internal combustion engine and a dynamo connected therewith and having a shunt field circuit; of a switch for controlling said field circuit; of ignition devices for the engine; of a storage battery; means for rendering the ignition devices operative and for connecting the battery with the dynamo and for controlling said field circuit switch for rendering the field circuit operative, said means being rendered inoperative upon diminution of current flow from the dynamo to the battery; and manually operated means for causing said first means to be inoperative whereby said field circuit is rendered inoperative and for connecting the ignition devices with the battery whereby the engine may be operated with the dynamo idle.

In testimony whereof we hereto affix our signatures.

ERNEST DICKEY.
LESTER S. KEILHOLTZ.